US009851062B1

(12) United States Patent
Davis et al.

(10) Patent No.: US 9,851,062 B1
(45) Date of Patent: Dec. 26, 2017

(54) LED GROW LIGHT MODULE

(71) Applicants: Richard C. Davis, Brighton, CO (US); Terri L. Broersma, Brighton, CO (US)

(72) Inventors: Richard C. Davis, Brighton, CO (US); Terri L. Broersma, Brighton, CO (US)

(73) Assignees: Richard C. Davis, Brighton, CO (US); Terri L. Broersma, Brighton, CO (US)

( * ) Notice: Subject to any disclaimer, the term of this patent is extended or adjusted under 35 U.S.C. 154(b) by 0 days.

(21) Appl. No.: 15/249,147

(22) Filed: Aug. 26, 2016

(51) Int. Cl.
| | |
|---|---|
| *F21L 4/00* | (2006.01) |
| *F21S 2/00* | (2016.01) |
| *F21V 23/02* | (2006.01) |
| *F21V 23/06* | (2006.01) |
| *H05B 37/02* | (2006.01) |
| *F21V 21/088* | (2006.01) |
| *F21S 9/03* | (2006.01) |
| *A01G 7/04* | (2006.01) |
| *F21Y 115/10* | (2016.01) |

(52) U.S. Cl.
CPC .............. *F21S 2/005* (2013.01); *A01G 7/045* (2013.01); *F21S 9/032* (2013.01); *F21V 21/088* (2013.01); *F21V 23/02* (2013.01); *F21V 23/06* (2013.01); *H05B 37/0281* (2013.01); *F21Y 2115/10* (2016.08)

(58) Field of Classification Search
CPC ...... F21S 2/005; F21S 9/032; H05B 37/0281; A01G 7/045; F21V 23/02; F21V 23/06; F21V 21/088; F21Y 2115/10
See application file for complete search history.

(56) References Cited

U.S. PATENT DOCUMENTS

| | | | |
|---|---|---|---|
| 6,851,831 B2* | 2/2005 | Karlicek, Jr. .......... | H01R 29/00 362/227 |
| 2007/0236947 A1* | 10/2007 | Jensen .................... | F21S 6/001 362/392 |
| 2010/0118532 A1* | 5/2010 | Liang ..................... | F21S 2/005 362/235 |
| 2015/0121753 A1* | 5/2015 | Jenner ................... | A01G 7/045 47/58.1 LS |

* cited by examiner

*Primary Examiner* — Donald Raleigh
(74) *Attorney, Agent, or Firm* — Holzer Patel Drennan

(57) ABSTRACT

A modular LED grow light system is provided that includes one or more LED grow light modules. Each of the LED grow light modules includes one or more connecting ports and an LED. The one or more connecting ports are configured to connect to another LED grow light module. A power source is connected to one of the connecting ports of the one or more LED grow light modules. The LEDs of the one or more LED grow light modules provide light to a portion of a plant.

20 Claims, 7 Drawing Sheets

LED GROW LIGHT MODULE

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

In one implementation, a modular LED grow light system includes one or more LED grow light modules. Each of the LED grow light modules includes one or more connecting ports and an LED. The one or more connecting ports are configured to connect to another LED grow light module. A power source is connected to one of the connecting ports of the one or more LED grow light modules. The LEDs of the one or more LED grow light modules provide light to a portion of a plant.

BRIEF DESCRIPTIONS OF THE DRAWINGS

DETAILED DESCRIPTIONS

In commercial plant growing operations a large number of plants may be positioned under grow lights. The grow lights may be attached to a timer that is configured to provide lighting at varying intervals to optimize the plants yield. Such yield may include fruits, vegetables, flowers, etc. As the plants grow, the canopy or top branches of the plant may block light from reaching the bottom branches of the plants. Because the bottom branches do not receive as much light as the canopy, the bottom branches may not produce as much yield as the canopy. The plant may use energy to grow the bottom branches. However, this energy may be wasted on low yield. As such, some growers trim the bottom branches during certain stages of growing. As a result, the plant may direct the majority of its energy to the canopy, which results in higher yields.

In implementations described herein, a modular lighting system is described. The system includes a number of light emitting diode (LED) grow light modules. These LED modules are configured to be connected to one another around the lower branches of a plant. The system provides light to the lower branches, which may allow the lower branches to produce as much yield as the canopy. Thus, a grower can avoid trimming the lower branches and produce significantly more yield because the canopy and the lower branches are utilized. Furthermore, the modularity of the system described herein allows customization of the lighting structure such that the system may be placed in constrained spaces. The system may be attached directly to the stem of the plant or to a trellis or post. A number of the modules may be chained together such as to direct light to a large portion of the lower branches. It should be understood that the modular light system described may be utilized in other contexts such as for decorative lighting.

Figure 1:
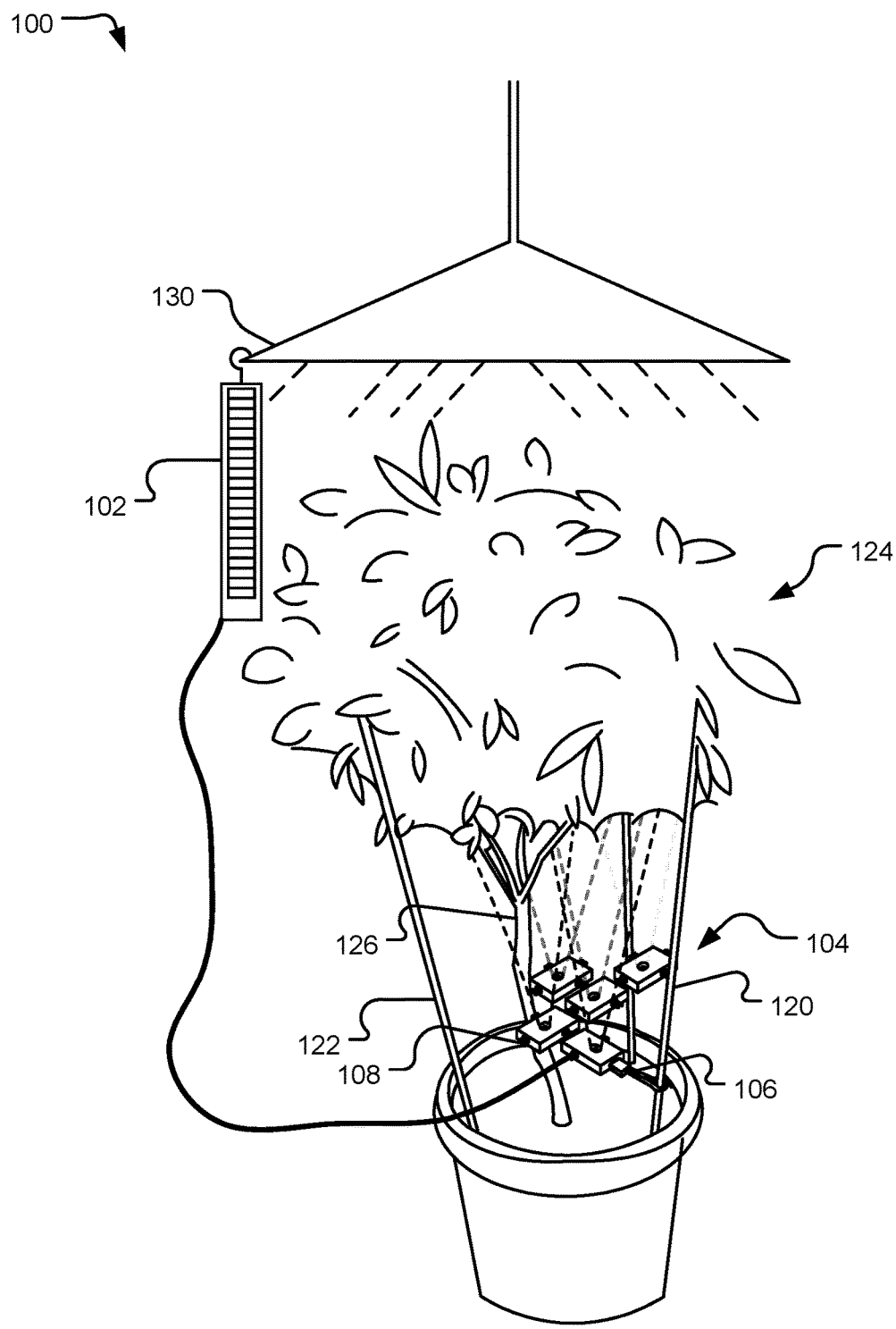
FIG. 1 illustrates an example implementation of an LED grow light system with a plurality of LED grow light modules.

FIG. 1 illustrates an example implementation of an LED grow system 100 with a plurality of LED grow light modules 104. The system 100 includes a solar panel 102, the plurality of LED grow light modules 104, and a mounting apparatus 106. The plurality of LED grow light modules 104 are mounted on a trellis 120 using the mounting apparatus 106. The trellis 120 (and a trellis 122) are supporting a plant 124 having a stem 126. In an alternative implementation, a power source other than the solar panel 102 may be used. Yet alternatively, a combination of a wall power source together with the solar panel 102 may also be used.

A lighting source 130 is providing light to the plant 124 from above the plant. The lighting source 130 may comprise any type of grow light including fluorescent lighting. In some implementations the lighting source 130 is natural light from the sun. The plurality of LED grow light modules 104 are providing light (illustrated by the dotted lines) to the plant 124 from beneath the plant 124. The plurality of LED grow light modules 104 are placed in a location where the typical lighting source 130 may not be able to reach. This may help the plant 124 produce more yield such as fruits, vegetables, flowers, etc.

Each of the plurality of LED grow light modules 104 includes a plurality of electrical connecting ports (e.g., an electrical connecting port 108). Each of the electrical connecting ports may be utilized to connect the LED grow light modules 104 to one another. Furthermore, the electrical connecting ports (e.g., the electrical connecting port 108) provide an electrical circuit to power each LED light of each of the LED grow light modules 104. The electrical connecting ports are positioned on the sides and ends of each of the LED grow light modules 104 such that another LED grow light module may be connected in a number of configurations. Furthermore, at least one electrical connecting port may be connected to the solar panel 102.

The plurality of LED grow light modules 104 are powered by the solar panel 102. The solar panel 102 includes hooks that may be utilized to hang the solar panel from the lighting source 130. As such, the solar panel is positioned to capture light emitted by the lighting source 130 to power the plurality of LED grow light modules. In implementations, the solar panel 102 may be positioned next to the lighting source 130 using other apparatuses such as chains, latches, rope, etc. In other implementations, the plurality of LED grow light modules 104 may be powered by a conventional electrical wall outlet, battery, generator, etc. In some implementations, the solar panel 102 may be electrically connected to a battery that stores energy captured by the solar panel 102. The battery may then be utilized to power the plurality of LED grow light modules.

In some implementations, the plurality of LED grow light modules 104 may be connected to the stem 126 of the plant or to another part of the plant 124 using the mounting apparatus 106. In some implementations, the mounting apparatus 106 is a post clip that clips to the stem 126 or one of the trellises (e.g., trellis 120 or 122). Furthermore, each of the electrical connecting ports (e.g., the electrical connecting port 108) may provide support for another LED grow light module. As such, a number of LED grow light modules may be supported by a single mounting apparatus 106. In other implementations, the plurality of LED grow light modules 104 may be supported by more than one mounting apparatus 106. Furthermore, the mounting apparatus 106 may be configured to connect to an electrical connecting port (e.g., the electrical connecting port 108). In other implementations, the mounting apparatus 106 may connect to another section of an LED grow light module.

In some implementations, the solar panel 102 or the LED grow light modules 104 are connected to a timer (not shown) or light sensor switch such as to provide periodic lighting as needed by the type of plant 124. In the implementation wherein the solar panel 102 is attached to the lighting source 130, the LED grow light modules 104 may be lit when the lighting source 130 is lit. As such, the LED grow light modules 104 are timed simultaneously with the lighting source 130. As a result, a separate timer for the LED grow light modules 104 may not be necessary.

The configuration of the LED grow light modules 104 allows a number of LED grow light modules 104 to be placed in a constrained area in a manner to maximize the light provided to a location on the plant 124 that would otherwise not receive much light from the lighting source 130. Such placement may allow the yield of the plant to be increased.

Figure 2:
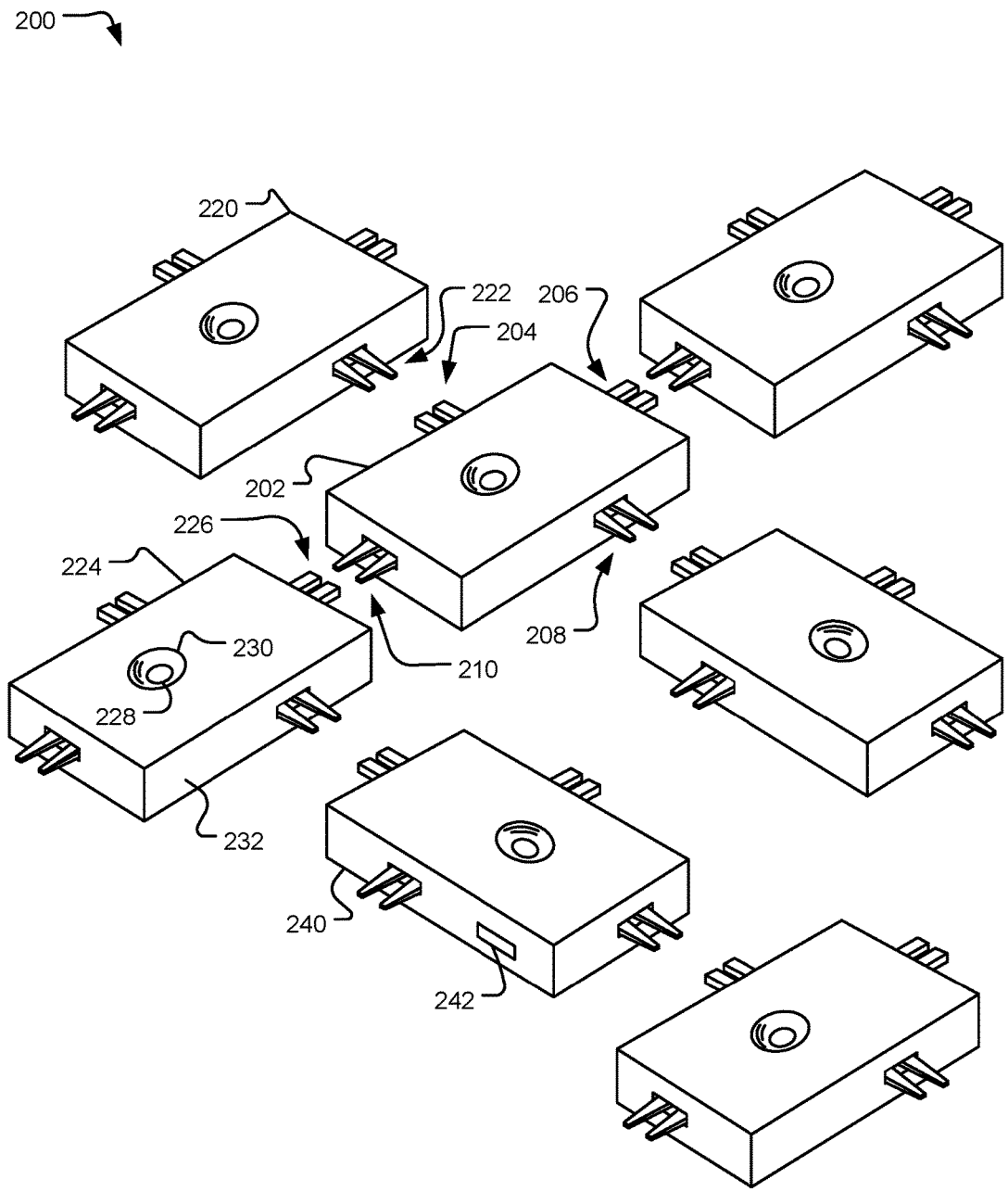
FIG. 2 illustrates a plurality of example LED grow light modules.

FIG. 2 illustrates a plurality of example LED grow light modules 200. Each of the LED grow light modules 200 includes four electrical connecting ports. For example, an LED grow light module 202 includes electrical connecting ports 204, 206, 208, and 210. In the illustrated implementation, the electrical connecting ports are pin and socket connector pairs. As such, electrical connecting ports 204 and 206 are a pair of socket connectors, and electrical connecting ports 208 and 210 are a pair of pin connectors. The socket connectors (e.g., electrical connecting ports 202 and 204) are configured to receive pin connectors from other LED grow light modules. For example, socket connector 204 may receive pin connector 222 of LED grow light module 220. The pin connectors (e.g., electrical connecting ports 208 and 210) are configured to be inserted into socket connectors of other LED grow light modules. For example, pin connector 210 may be inserted into a socket connector 226 of an LED grow light module 224. The LED grow light modules may have different configurations of connectors. For example, the LED grow light module 202 may include three pin connectors and one socket connectors or three socket connectors and one pin connector. It should be understood that other connection mechanisms may be employed. For example, the LED grow light modules 200 may include customized connectors that are not pin and socket (e.g., male and female) connectors such that any electrical connector may be connected to any other electrical connector. In other implementations, each connector (e.g., the electrical connecting port 204) may include one pin connector and one socket connector).

Each of the LED grow light modules includes an LED. For example, LED grow light module 224 includes an LED 228. The LED 228 is positioned in a recessed portion 230 of an outer casing 232 of the LED grow light module 224. The surface of the recessed portion 230 may be reflective to maximize light emanation by the LED 228. The LEDs may be any type of LED. In the illustrated implementation, the LED 228 is a 3 W LED lamp bead light configured to illuminate in the full spectrum (380 nm-840 nm). In other implementations the LED 228 may be a 3 W LED lamp bead light configured to illuminate in a blue spectrum (440 nm-450 nm). The particular spectrum may depend on the type of plant. It should be understood that other LED colors and spectrums may be utilized. It should also be understood that the LEDs may be different wattages. For example, the LED 228 may be in a range from 1 watt to 50 watts. In other implementations, the LEDs (e.g., the LED 228) may be greater than 50 watts. In some implementations, different LED grow light modules may be configured for a particular spectrum. As such, LED grow light modules with different spectrum colors may be combined in one system. In some implementations, each of the LED grow light modules 200 may include more than one LED.

In one implementation, the LEDs are replaceable. As such, during a first stage of growing, a first type of LED may be utilized. For example, during a vegetative stage of growing, the full spectrum (380 nm-840 nm) or the blue spectrum (440 nm-450 nm) LED light is utilized. Thereafter, during a flowering stage of growing, the LEDs may be replaced with a different spectrum LED (e.g., a yellow spectrum LED). In another implementation, an LED grow light module may include more than one LED, which may be activated depending on the growing stage of the plant.

The outer casing 232 may be steel, plastic, or any other suitable material. The outer casing 232 may be printed or formed of such material. The outer casing may be cut, etched, or punched to make holes for the electrical connectors and LEDs. In the illustrated implementation, the outer casing 232 is a rectangular box, but it should be understood that other configurations of the outer casing 232 may be employed. For example, the outer casing 232 may be spherical. An LED grow light module 240 includes a mounting port 242. The mounting port 242 is configured to receive a mounting apparatus (e.g., such as mounting apparatus 310 in FIG. 3). While in FIG. 2 the LED grow light module 240 is shown having the mounting port 242, in alternative implementations, all LED grow light modules may include a mounting port. Furthermore, the LED grow light modules may include mounting ports on one or more different sides than illustrated in FIG. 2. While in FIG. 2, the LED grow light modules are illustrated as being connected to each other in one plane, in an alternative implementation, the LED grow light modules may be configured such that at least one of the LED grow light modules connects to another one of the LED grow light modules vertical to the plane. In other words, one of the LED grow light modules may have an electrical connector on the top surface to connect to another of the LED grow light modules. Alternatively, an angular connector that connects between two electrical connectors may be used.

Figure 3:
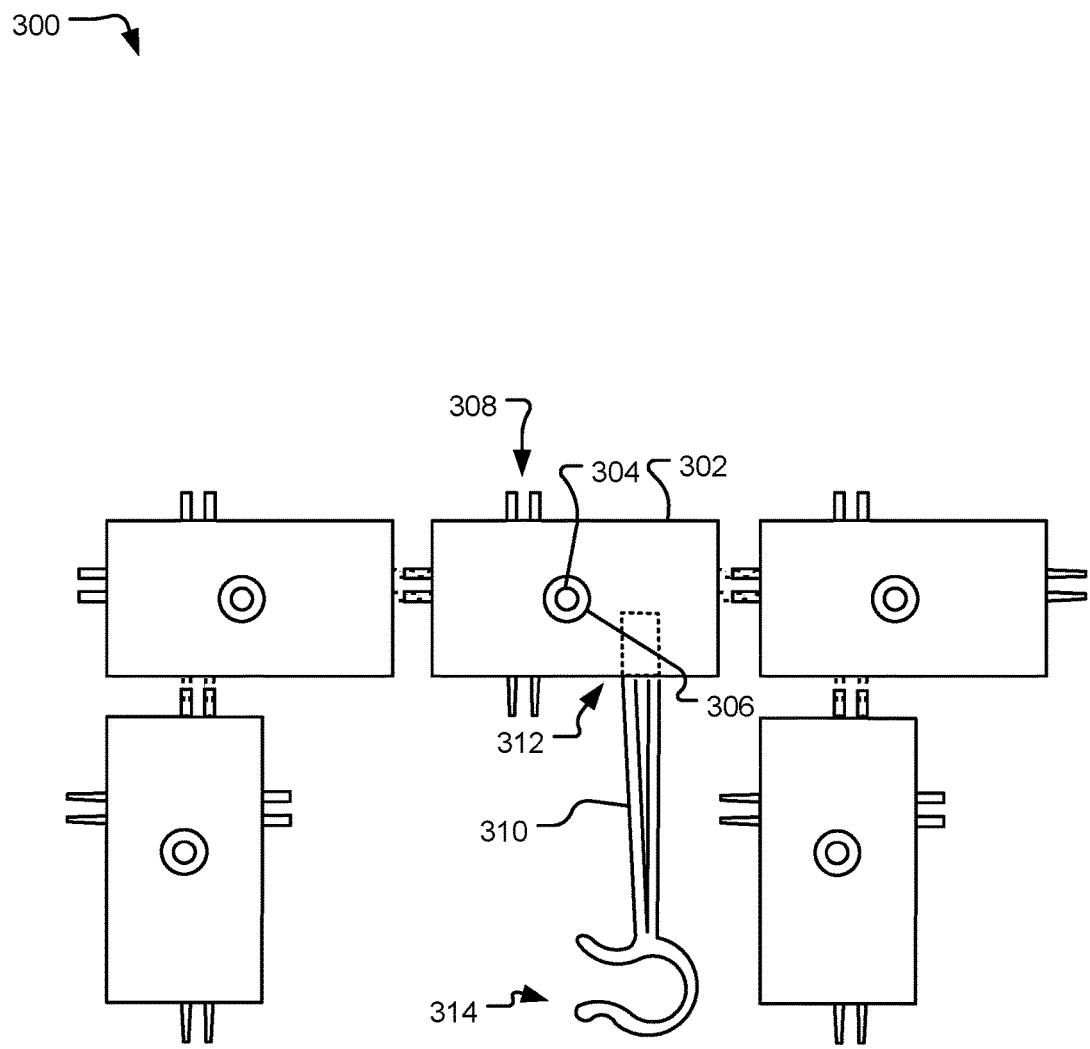
FIG. 3 illustrates a plan view of a plurality of example LED grow light modules connected in an example configuration.

FIG. 3 illustrates a plan view of a plurality of example LED grow light modules 300 connected in an example configuration. Each of the LED grow light modules 300 includes a plurality of electrical connectors and an LED light. For example, LED grow light module 302 includes electrical connector 308 and LED 304. The LED 304 is in a recessed portion 306 of the LED grow light module 302. The surface of the recessed portion 306 may include a reflective surface. It should be understood that each LED grow light module may include more than one LED in one or more recessed portions.

The LED grow light module 302 is connected to a mounting apparatus 310. The mounting apparatus 310 has a first end 312 and a second end 314. The first end 312 of the mounting apparatus 310 is configured to friction fit into a dedicated mounting port (not shown) of the led grow light module 302. In other implementations, the first end 312 includes a recessed area that is configured to receive an electrical connector of an LED grow light module. The electrical connector may fit into the recessed portion 306 of the first end 312 via friction fit. Other connection mechanisms may be employed. The second end 314 of the mounting apparatus 310 includes a clamp or hook that is configured to connect to a trellis or stem of a plant. Other mechanisms to connect the mounting apparatus 310 to a structure may be employed.

Figure 4:
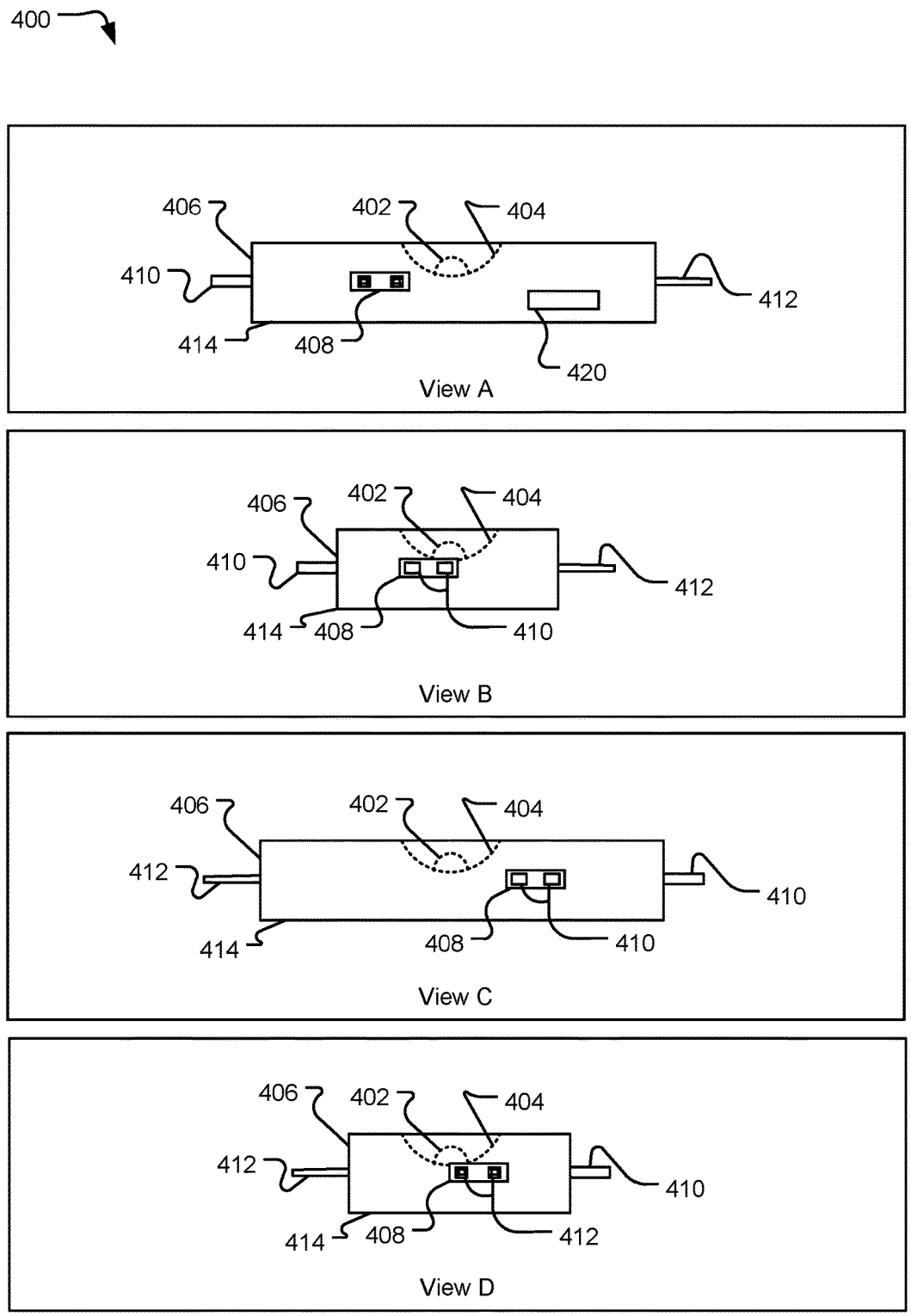
FIG. 4 illustrates various elevation views of an example LED grow light module.

FIG. 4 illustrates various elevation views 400 of an example LED grow light module 406. Specifically, View A illustrates a first side elevation view of the example LED grow light module 406; View B illustrates a first end elevation view of the example LED grow light module 406; View C illustrates a second side elevation view of the example LED grow light module 406; and View D illustrates a second end elevation view of the example LED grow light module 406.

The LED grow light module 406 includes an LED 402, socket electrical connector 410, and pin electrical connectors 412. The socket electrical connectors 410 and the pin electrical connectors 412 protrude through an opening 408 of the outer casing 414 of the LED grow light module 406. The LED 402 is positioned in a recessed portion 404 of the LED grow light module 406. The LED grow light module 406 further includes a mounting port 420 which is configured to receive a mounting apparatus (not shown) and friction fit to the mounting apparatus such that the mounting apparatus may provide support for the LED grow light module 406 and other connected LED grow light modules (not shown). While FIG. 4 shown the mounting port 420 on one side of the LED grow light module 406, in alternative implementations, the mounting port 420 may be located on one or more alternative sides (e.g., sides, top, and/or bottom) of the LED grow light module 406.

Figure 5:
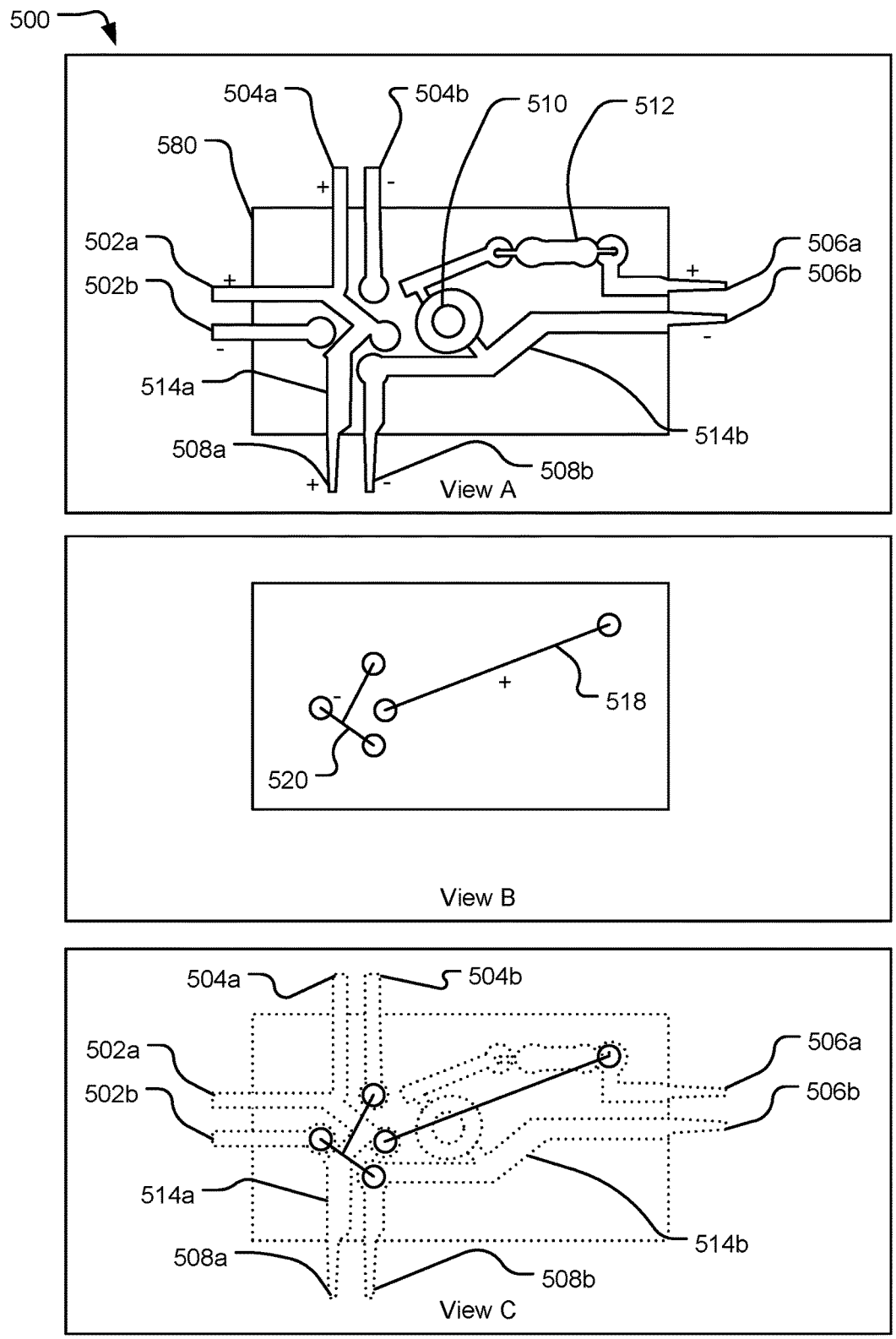
FIG. 5 illustrates plan views of an example printed circuit board used in an LED grow light module.

FIG. 5 illustrates an example printed circuit board (PCB) 500 used in an LED grow light module. View A of FIG. 5 illustrates the PCB 500 from a first plan view, which shows the top of the PCB 500. View B of FIG. 5 illustrates the PCB 500 from a second plan view, which shows the back of the PCB 500 from the same perspective as view A. View C of FIG. 5 illustrates the PCB 500 from a third plan view, which illustrates the back of the PCB from the same perspective as view B with an outline of components illustrated in View A.

Referring now to View A, the printed circuit board 500 includes a PCB substrate 580, a plurality of connectors 502, 504, 506, 508, an LED 510, a resistor 512, and electrical traces 514. The plurality of connectors may be pin (male) and socket (female) connectors. The connectors 502 and 504 are socket connectors and the connectors 506 and 508 are pin connectors. Each set of connectors includes a positive connector (e.g., connectors 502a, 504a, 506a and, 508a) and a negative connector (e.g., connectors 502b, 504b, 506b, and 508b). Positive connectors 502a, 504a, and 508a are electrically connected to one another via electrical trace 514a. The other positive connector 506a, is connected to positive connectors 502a, 504a, and 508a on the rear side of the PCB substrate 580, as illustrated in View B. The negative connectors 506b and 508b are electrically connected via electrical trace 514b. The negative connectors 502b and 504b are connected to negative connectors 506b and 508b on the reverse side of the printed circuit board substrate, as illustrated in view B. The electrical connectors 502-508 are configured to connect the printed circuit board 500 of an LED grow light module to another printed circuit board of another LED grow light module. Because the printed circuit board 500 of the LED grow light module includes four connection points, a second LED grow light module may be connected in a number of different configurations. It should be understood that other methods or configurations may be used to connect a number of LED grow light modules and PCBs together. The electrical traces 514a and 514b may be printed on the PCB 580 or may be any other type of electrically connecting structure such as wiring.

The resistor 512 may depend on the wattage of the LED 510. For example, implementations that use a 3 W LED may include a 22K ohms+/−5% resistor. In implementations using a 10 W LED, a different resistance may be selected.

Referring now to View B and View C, a connector 518 is an electrical trace or copper wiring that connects electrical connector 506a to the electrical trace 514a, which thereby connects the electrical connector 506a to electrical connectors 502a, 504a, and 508a. These connections form the positive circuit of the PCB 500.

Connectors 520 connect electrical connectors 502b and 504b to electrical trace 514b, thereby providing a complete connection between electrical connectors 502b, 504b, 506b, and 508b. These connections form the negative circuit of the circuit of the PCB 500. The connectors 518 and 520 may be connected to the various components on the front of the PCB 500 through holes or voids that are punched or etched through the substrate 580. The connections may be soldered or otherwise connected. It should be understood that other configurations may be employed.

Figure 6:
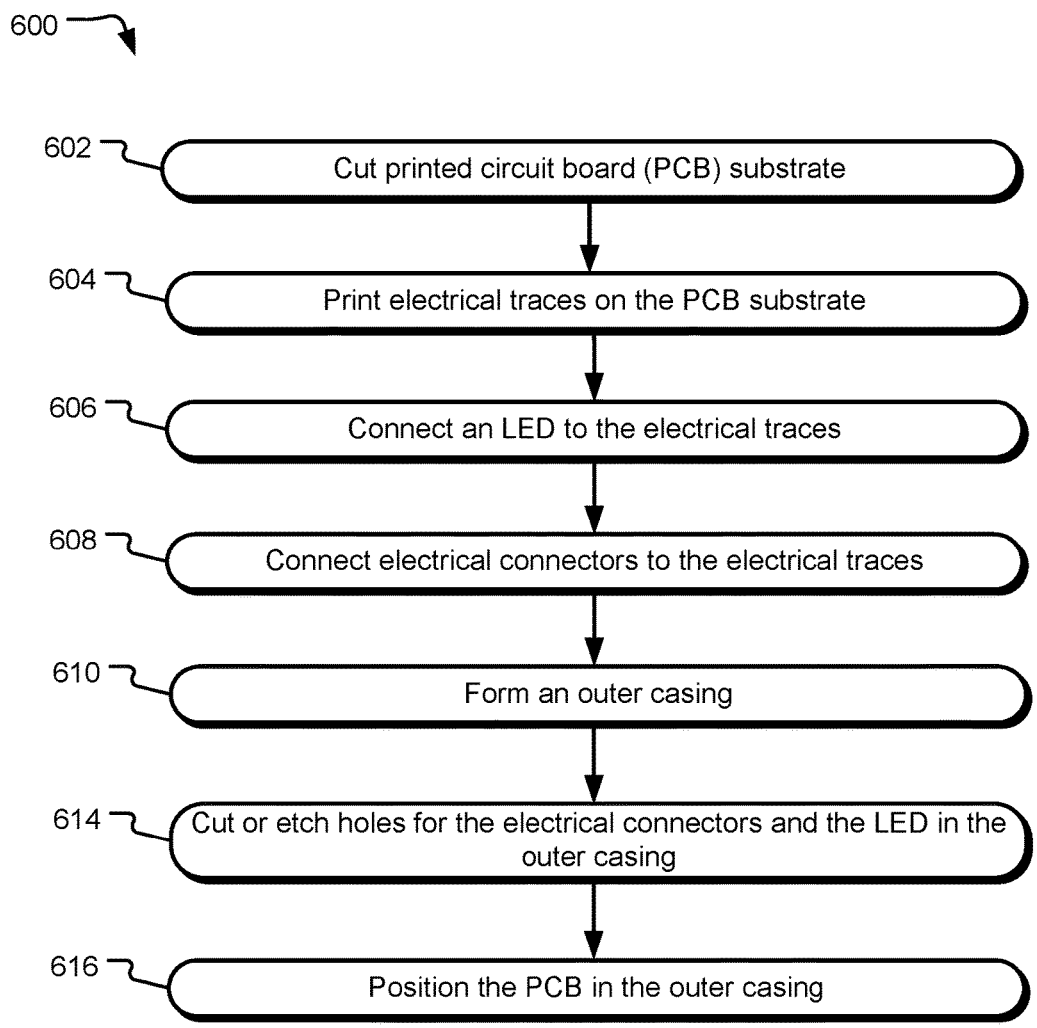
FIG. 6 illustrates example operations for manufacturing an LED grow light module.

FIG. 6 illustrates example operations 600 for manufacturing an LED grow light module. A cutting operation 602 cuts a printed circuit board (PCB) substrate to a desired size. The cutting operation 602 may include punching or etching holes or voids for electrical trace connections or support holes for various components. A printing operation 604 prints electrical traces on the PCB substrate. A connecting operation 606 connects an LED to the electrical traces. A second connecting operation 608 connects electrical connectors to the electrical traces. The electrical connectors may be pin and socket connectors.

A forming operation 610 forms an outer casing. Forming operation may include printing the outer casing (e.g., 3D printing) or mold forming the outer casing. A second cutting operation 614 cuts or etches holes for electrical connectors and the LED in the outer casing. A positioning operation 616 positions the PCB in the outer casing.

Figure 7:
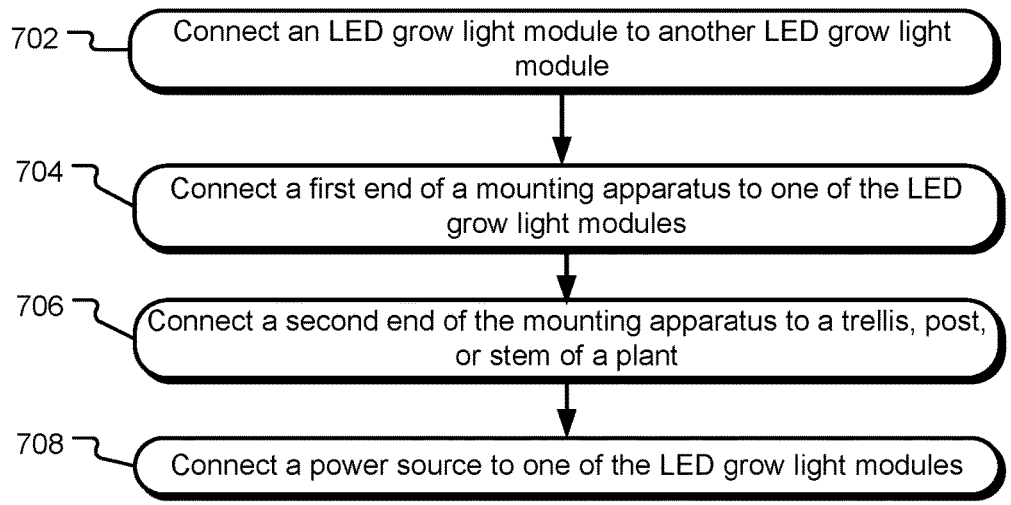
FIG. 7 illustrates example operations for using an LED grow light system.

FIG. 7 illustrates example operations 700 for using an LED grow light system. A first connecting operation 702 connects an LED grow light module to another LED grow light module. The connecting operation 702 may include inserting pin connectors of a first LED grow light module into socket connectors of a second LED grow light module. The connecting operation 702 may be repeated until a desired number and configuration of LED grow light modules is achieved. A second connecting operation 704 connects a first end of a mounting apparatus to one of the LED grow light modules. A third connecting operation 706 connects a second end of the mounting apparatus to a trellis, post, or stem of a plant. The third connecting operation 706 may include positioning the LED grow light modules to a desired location on the plant. A fourth connecting operation 708 connects a power source to one of the LED grow light modules. In one implementation, the power source may be a solar panel attached to a grow light. In other implementations, the power source may be a wall socket, plug, battery, etc.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims. Although the present invention has been described with reference to preferred embodiments, workers skilled in the art will recognize that changes may be made in form and detail without departing from the scope of the invention. The implementations described above and other implementations are within the scope of the following claims.

What is claimed is:

1. An LED grow light system comprising:
    a panel configured to be positioned close to an artificial lighting source such that the solar panel is positioned to receive light emitted by the artificial lighting source;
    a mounting apparatus; and
    a first LED grow light module connected to the mounting apparatus and electrically connected to the solar panel, the first LED grow light module having at least four connecting ports and an LED powered by the solar panel, each of the at least four connecting ports configured to electrically connect the first LED grow light module to a connecting port of a second LED grow light module, the first LED grow light module being positioned relative to a plant such that the LED powered by the solar panel emits light to a location on the plant.

2. The LED grow light system of claim 1, wherein the mounting apparatus includes a first end and a second end and wherein the first end is connected to the first LED grow light module and wherein the second end is configured to be connected to a trellis or a stem of the plant and to support the LED grow light module to emit light to the location on the plant when the artificial lighting source emits light.

3. The LED grow light system of claim 1 wherein the at least four connecting ports comprise a combination of pin connecting ports and socket connecting ports.

4. The LED grow light system of claim 3, wherein the combination of pin connecting ports and socket connecting ports comprises three socket connecting ports and one pin connecting port.

5. The LED grow light system of claim 3, wherein the combination of pin connecting ports and socket connecting ports comprises three pin connecting ports and one socket connecting port.

6. The LED grow light system of claim 1 wherein at least one connecting port of the at least four connecting ports is connected to the connecting port of the second LED grow light module, a power source of the second LED grow light module being the first LED grow light module.

7. The LED grow light system of claim 1 wherein the LED is positioned in a recessed portion of an outer casing of the LED grow light module.

8. The LED grow light system of claim 1 wherein the LED is configured to emit light when the artificial lighting source emits light.

9. The LED grow light system of claim 1 wherein the solar panel is positioned close to the artificial lighting source using one or more hooks hanging the solar panel from the artificial lighting source.

10. An LED grow light module comprising:
    an outer casing;
    at least four connecting ports extending through holes in the outer casing and configured to connect the LED grow light module to a second LED grow light module, at least one of the four connecting ports configured to be connected to a solar panel attachable to an artificial lighting source such that the solar panel is positioned to receive light emitted by the artificial lighting source; and
    an LED positioned in a recessed portion of the outer casing, the LED configured to be powered by the solar panel and to emit light to a location on a plant.

11. The LED grow light module of claim 10 wherein the at least four connecting ports include two socket connecting ports and two pin connecting ports.

12. The LED grow light module of claim 10 wherein the at least four connecting ports include three socket connecting ports one pin connecting port.

13. The LED grow light module of claim 10, further including a mounting apparatus having a first end and a second end, the first end being connected to one of the at least four connecting ports and the second end being configured to be connected to at least one of a stem of the plant, a trellis, and a post.

14. A method comprising:
    positioning a solar panel close to an artificial lighting source such that the solar panel is positioned to receive light emitted by the artificial lighting source;
    electrically connecting a first LED grow light module to the solar panel, the LED grow light module having at least four connecting ports and an LED powered by the solar panel, each of the at least four connecting ports configured to electrically connect the first LED grow light module to a connecting port of a second LED grow light module; and
    positioning the LED grow light module such that the LED powered by the solar panel directs light a desired location on a plant.

15. The method of claim 14 wherein positioning the LED grow light module further comprises:
    attaching the LED grow light module to a first end of a mounting apparatus, the mounting apparatus further including a second end configured to be connected to a trellis or a stem of the plant, the mounting apparatus further configured to support the LED grow light module.

16. The method of claim 14 wherein the LED is configured to emit light when the artificial lighting source emits light.

17. The method of claim 14 wherein the artificial lighting source is fluorescent lighting.

18. The method of claim 14 where in the artificial lighting source is configured to generate light using electricity.

19. The method of claim 14 wherein positioning the solar panel includes hanging the solar panel from the artificial lighting source.

20. The method of claim 14 wherein a spectrum of the LED is selected based on a stage of growing of the plant.

* * * * *

UNITED STATES PATENT AND TRADEMARK OFFICE
CERTIFICATE OF CORRECTION

| | |
|---|---|
| PATENT NO. | : 9,851,062 B1 |
| APPLICATION NO. | : 15/249147 |
| DATED | : December 26, 2017 |
| INVENTOR(S) | : Richard C. Davis and Terri L. Broersma |

It is certified that error appears in the above-identified patent and that said Letters Patent is hereby corrected as shown below:

In the Claims

Column 7, Line 2, Claim 1, currently reads as "A PANEL CONFIGURED TO BE POSITIONED CLOSE TO AN ARTIFICIAL" and it should be changed to --A SOLAR PANEL CONFIGURED TO BE POSITIONED CLOSE TO AN ARTIFICIAL--.

Signed and Sealed this
Nineteenth Day of June, 2018

Andrei Iancu
*Director of the United States Patent and Trademark Office*